US012057278B2

(12) United States Patent
Sato et al.

(10) Patent No.: US 12,057,278 B2
(45) Date of Patent: Aug. 6, 2024

(54) GAS CIRCUIT BREAKER

(71) Applicant: Mitsubishi Electric Corporation, Tokyo (JP)

(72) Inventors: Koma Sato, Tokyo (JP); Yuji Yoshitomo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 149 days.

(21) Appl. No.: 17/778,083

(22) PCT Filed: Jan. 17, 2020

(86) PCT No.: PCT/JP2020/001571
§ 371 (c)(1),
(2) Date: May 19, 2022

(87) PCT Pub. No.: WO2021/144985
PCT Pub. Date: Jul. 22, 2021

(65) Prior Publication Data
US 2022/0351925 A1 Nov. 3, 2022

(51) Int. Cl.
*H01H 33/16* (2006.01)
*H01H 33/91* (2006.01)

(52) U.S. Cl.
CPC .......... *H01H 33/161* (2013.01); *H01H 33/91* (2013.01)

(58) Field of Classification Search
CPC .... H01H 33/161; H01H 33/166; H01H 33/04; H01H 33/91; H01H 33/70; H01H 3/60
(Continued)

(56) References Cited

U.S. PATENT DOCUMENTS 3,745,284 A 7/1973 Hosokawa
4,421,962 A 12/1983 Thuries et al.
(Continued)

FOREIGN PATENT DOCUMENTS

JP S50154462 U 12/1975
JP S52158867 U 12/1977
(Continued)

OTHER PUBLICATIONS

International Search Report (PCT/ISA/210) with English translation, and Written Opinion (PCT/ISA/237), mailed on Mar. 31, 2020, by the Japan Patent Office as the International Searching Authority for International Application No. PCT/JP2020/001571.
(Continued)

*Primary Examiner* — William A Bolton
(74) *Attorney, Agent, or Firm* — BUCHANAN INGERSOLL & ROONEY PC

(57) ABSTRACT

A gas circuit breaker including: a cylindrical tank; a stator fixed inside the tank; and a mover disposed so as to face the stator. The mover is movable between a closing position and a cutoff position, the mover is in contact with the stator when located in the closing position, and the mover is out of contact with the stator when located in the cutoff position. The stator includes: a stator-side main contact fixed inside the tank; a stator-side resistance contact having a ring shape surrounding the stator-side main contact; and a spring and a dashpot supporting the stator-side resistance contact from a direction opposite to a direction in which the stator-side resistance contact faces the mover. The mover includes: a mover-side main contact disposed so as to face the stator-side main contact; and a mover-side resistance contact disposed in such a way as to face the stator-side resistance contact.

2 Claims, 8 Drawing Sheets

(58) Field of Classification Search
USPC .......................... 218/143, 77, 79, 80, 94, 97
See application file for complete search history.

(56) References Cited

U.S. PATENT DOCUMENTS

| | | | | | |
|---|---|---|---|---|---|
| 5,276,285 | A * | 1/1994 | Pham | H01H 33/161 | 218/143 |
| 5,567,924 | A * | 10/1996 | Yano | H01H 33/166 | 335/6 |
| 5,717,184 | A * | 2/1998 | Girodet | H01H 33/166 | 218/7 |
| 7,078,643 | B2 * | 7/2006 | Rostron | H01H 33/166 | 218/144 |
| 8,426,760 | B2 * | 4/2013 | Holaus | H01H 33/16 | 218/78 |
| 9,035,729 | B2 * | 5/2015 | Nomura | H02H 3/02 | 335/177 |
| 9,997,321 | B2 * | 6/2018 | Lee | H01H 71/10 | |

FOREIGN PATENT DOCUMENTS

| | | | |
|---|---|---|---|
| JP | S538577 | U | 1/1978 |
| JP | H01313823 | A | 12/1989 |
| JP | H06103856 | A | 4/1994 |
| JP | 2000251594 | A | 9/2000 |
| JP | 2013179004 | A | 9/2013 |

OTHER PUBLICATIONS

Notification of Reason for Refusal, with English translation, issued Oct. 13, 2020 for Japanese Patent Application No. 2020-533311, corresponding to PCT/JP2020/001571.

Extended European Search Report issued in corresponding European Patent Application No. 20913739.7, mailed on Feb. 13, 2023, 8 pages.

* cited by examiner

GAS CIRCUIT BREAKER

FIELD

The present disclosure relates to a resistance-closing type gas circuit breaker connected to a resistor that suppresses overvoltage at the time of closing.

BACKGROUND

There are gas circuit breakers that perform closing operation and breaking operation in cylindrical tanks in which insulating gas is enclosed. Among such gas circuit breakers, a resistance-closing type gas circuit breaker generally includes a main breaking unit for performing closing and breaking, and a resistance closing unit that suppresses overvoltage at the time of closing. The main breaking unit includes a main contact, an arcing contact, a puffer cylinder, and a nozzle. The main contact serves as a main flow path of current. The arcing contact is for extinguishing an arc generated during breaking operation. The volume of the puffer cylinder decreases during the breaking operation. The nozzle is connected to an internal space of the puffer cylinder, and is directed to the arcing contact. The main breaking unit includes, as the main contact and the arcing contact, a stator-side main contact, a stator-side arcing contact, a mover-side main contact, and a mover-side arcing contact. The stator-side main contact and the stator-side arcing contact are fixed in the tank. The mover-side main contact and the mover-side arcing contact move in an axial direction of the tank due to force transmitted from an operating device. The resistance closing unit includes a stator-side resistance contact and a mover-side resistance contact. The stator-side resistance contact is fixed in the tank. The mover-side resistance contact moves in the axial direction of the tank due to force transmitted from the operating device. In the closing operation, the resistance contacts are closed before the main contacts and the arcing contacts are closed, so that overvoltage is suppressed from occurring in a system during the closing operation. In the breaking operation, the arcing contacts are opened after the opening of the main contacts and the resistance contacts, and gas compressed in the puffer cylinder passes through the inside of the nozzle to cool an arc generated between the arcing contacts, so that the arc is extinguished.

In a gas circuit breaker including a resistance closing unit separately from a main breaking unit, driving force of the operating device in the closing operation and the breaking operation is transmitted from the operating device to the main breaking unit and transmitted from the operating device to the resistance closing unit through separate power transmission paths. Therefore, the problem with such a gas circuit breaker is that an increase in the number of parts causes an increase in weight and an increase in size of an arc-extinguishing chamber.

Patent Literature 1 discloses a gas circuit breaker including a puffer cylinder and a resistance contact that are integrated. The gas circuit breaker disclosed in Patent Literature 1 has a common power transmission path serving as a power transmission path from an operating device to a main breaking unit and a power transmission path from the operating device to a resistance closing unit, leading to a reduction in the number of parts and downsizing of an arc-extinguishing chamber.

CITATION LIST

Patent Literature

Patent Literature 1: Japanese Patent Application Laid-open No. 1-313823

SUMMARY

Technical Problem

A gas circuit breaker requires a shield for protecting a main contact so as to prevent an electric field generated at the time of energization from being locally concentrated on the main contact. In the gas circuit breaker disclosed in Patent Literature 1 above, a stator-side resistance contact is pushed in as operation for closing a mover-side resistance contact is performed, while a stator-side shield does not move from a fixed position. In addition, charging current of the system has a current phase advanced by 90 degrees with respect to a voltage phase, and has a smaller current value than a rated interrupting current of the gas circuit breaker. Therefore, the charging current is referred to as a small current. Furthermore, breaking is generally successfully conducted at a current zero point. Therefore, when the small current is interrupted, a high voltage is charged on a secondary side, and AC voltage supplied from a power source continues to be applied to a primary side, so that there is generated a high potential difference between terminals of the main contact. In the gas circuit breaker disclosed in Patent Literature 1, when a small current is interrupted, an arc is extinguished before an insulation distance between the mover-side resistance contact and the stator-side shield is ensured. Therefore, there is a possibility that, in the gas circuit breaker disclosed in Patent Literature 1, when a small current is interrupted, an arc is extinguished before the insulation distance between the mover-side resistance contact and the stator-side shield is ensured, leading to an increase in potential difference between the mover-side resistance contact and the stator-side shield, so that reignition may be caused.

The present disclosure has been made in view of the above, and an object of the present disclosure is to obtain a gas circuit breaker that suppresses occurrence of reignition at the time of interruption of a small current while reducing weight and the number of parts.

Solution to Problem

In order to solve the above-described problems and achieve the object, a gas circuit breaker according to the present disclosure includes: a cylindrical tank in which insulating gas is enclosed; a stator fixed inside the tank; and a mover disposed in such a way as to face the stator in an axial direction of the tank, the mover being movable between a closing position and a cutoff position, the mover being in contact with the stator when located in the closing position, the mover being out of contact with the stator when located in the cutoff position. The stator includes: a stator-side main contact extending in the axial direction of the tank, the stator-side main contact being fixed inside the tank; a stator-side resistance contact connected to an electric resistor, the stator-side resistance contact having a ring shape surrounding the stator-side main contact from an outer circumferential direction of the tank; and a spring and a dashpot supporting the stator-side resistance contact from a direction opposite to a direction in which the stator-side resistance contact faces the mover, the spring and the dashpot supporting the stator-side resistance contact such that the stator-side resistance contact is movable in the axial direction of the tank, the spring and the dashpot biasing the stator-side resistance contact in a direction in which the stator-side resistance contact approaches the mover. The mover includes: a mover-side main contact disposed in such a way as to face the stator-side main contact in the axial direction of the tank; and a mover-side resistance contact disposed in such a way as to face the stator-side resistance contact in the axial direction of the tank. In a state where the mover is located in the cutoff position, a distance between the mover-side resistance contact and the stator-side resistance contact is less than a distance between the mover-side main contact and the stator-side main contact.

Advantageous Effects of Invention

According to the present disclosure, it is possible to obtain a gas circuit breaker that achieves the effect of suppressing occurrence of reignition at the time of interruption of a small current while reducing weight and the number of parts.

DESCRIPTION OF EMBODIMENTS

Hereinafter, a gas circuit breaker according to each embodiment will be described in detail with reference to the drawings. Note that the present disclosure is not limited to the embodiments.

First Embodiment

Figure 1:
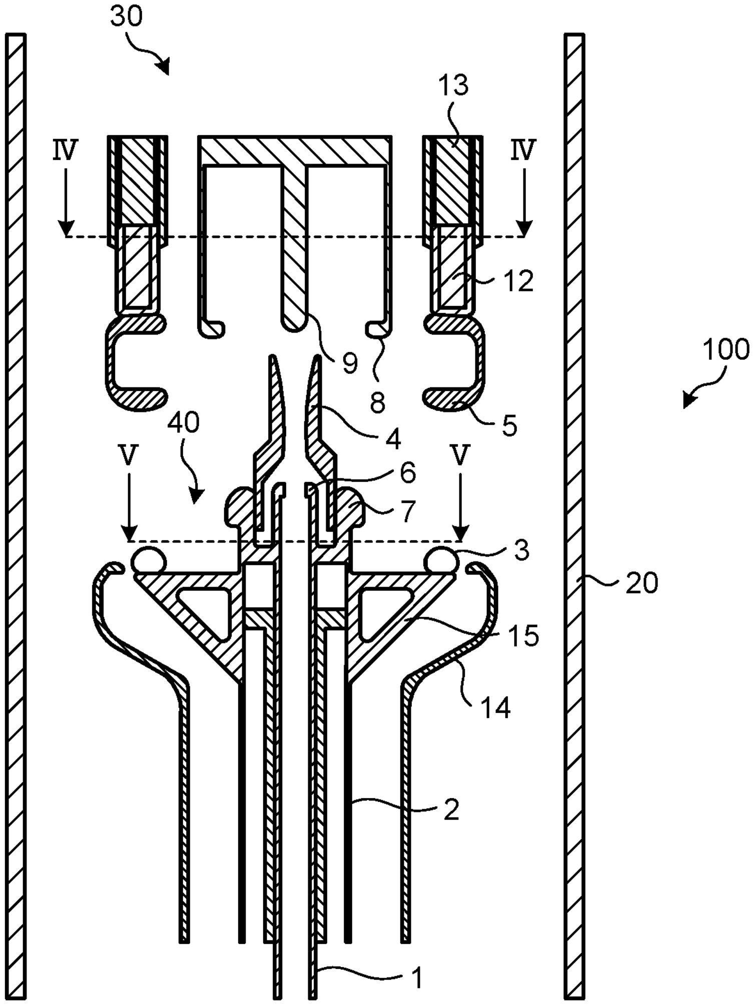
FIG. 1 is a cross-sectional view of a gas circuit breaker according to a first embodiment along an axial direction of a tank, the gas circuit breaker being in an open-circuit state.
Figure 2:
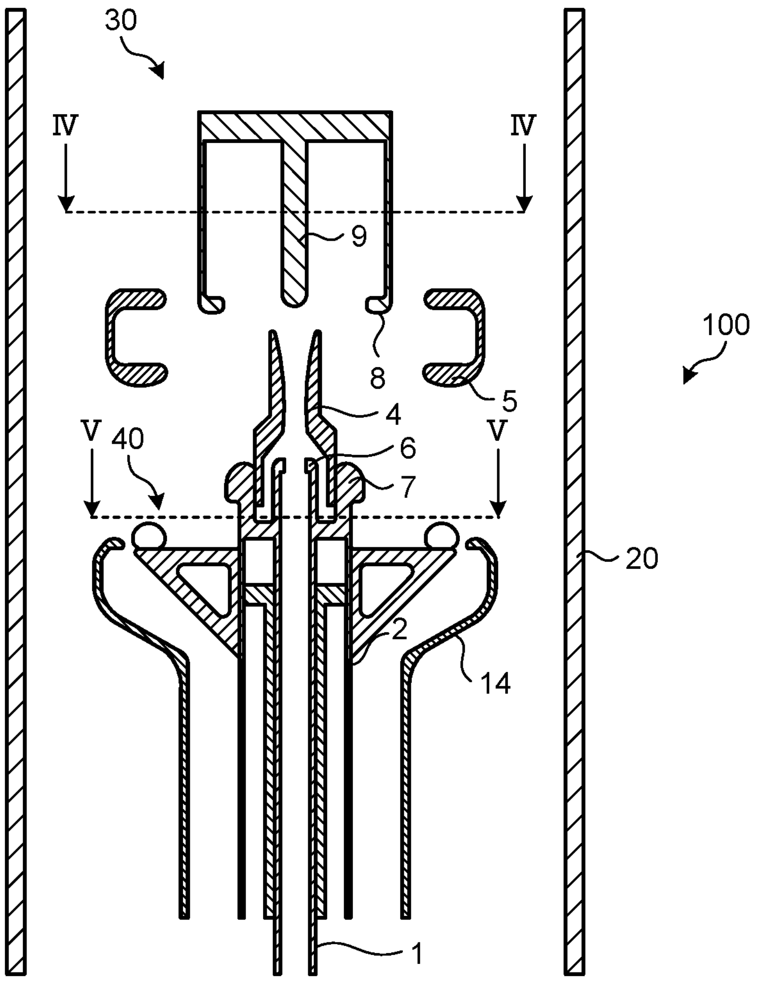
FIG. 2 is a cross-sectional view of the gas circuit breaker according to the first embodiment along the axial direction of the tank, the gas circuit breaker being in an open-circuit state.
Figure 3:
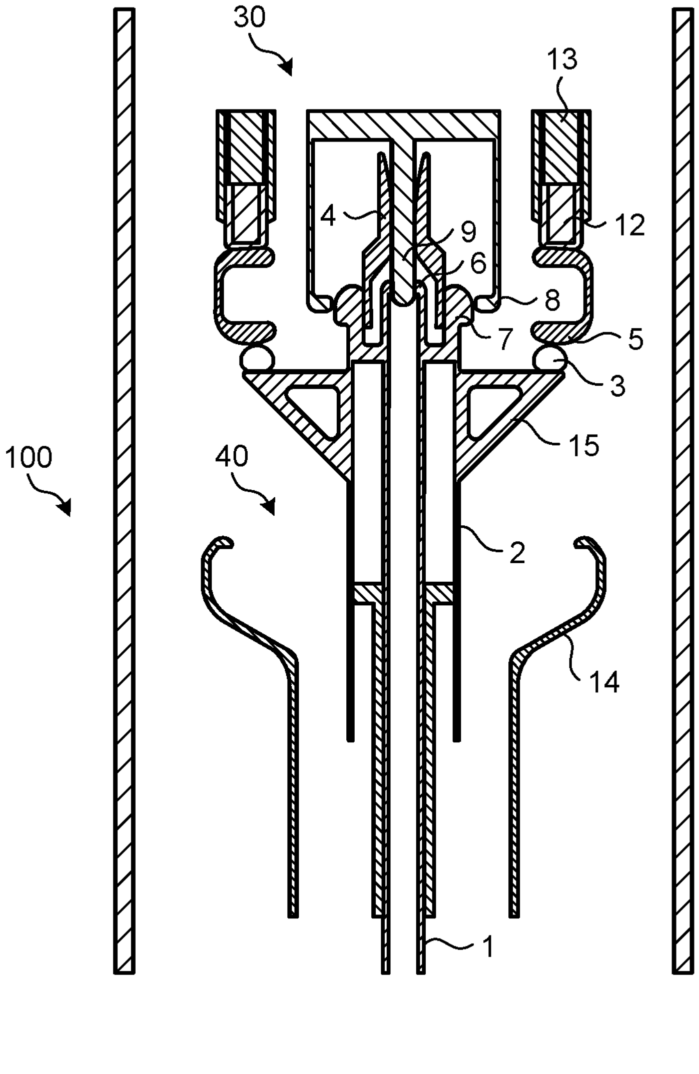
FIG. 3 is a cross-sectional view of the gas circuit breaker according to the first embodiment along the axial direction of the tank, the gas circuit breaker being in a closed-circuit state.
Figure 4:
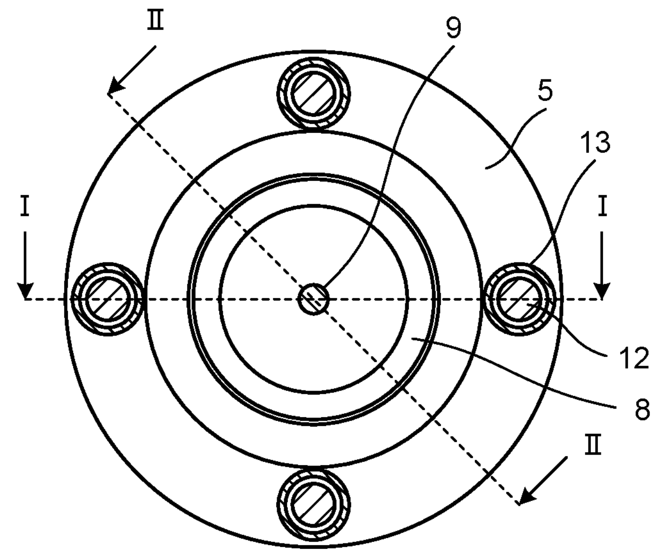
FIG. 4 is a diagram illustrating a stator of the gas circuit breaker according to the first embodiment, the stator being viewed in cross section perpendicular to the axial direction of the tank.
Figure 5:
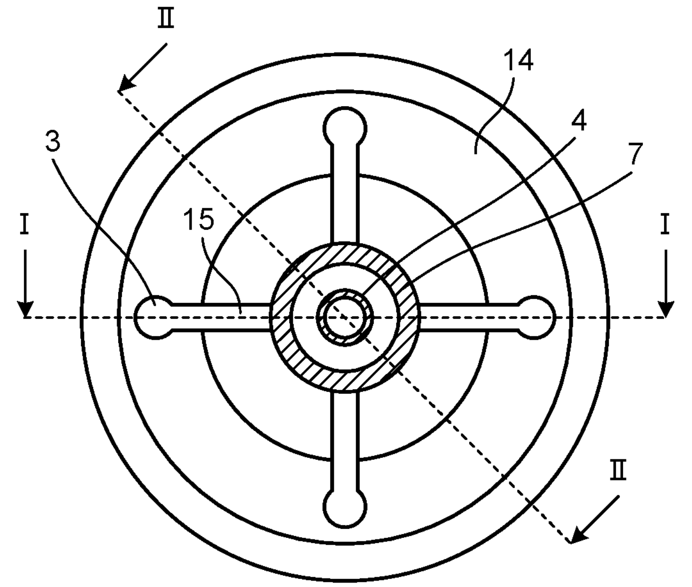
FIG. 5 is a diagram illustrating a mover of the gas circuit breaker according to the first embodiment, the mover being viewed in cross section perpendicular to the axial direction of the tank.

FIGS. 1 and 2 are cross-sectional views of a gas circuit breaker according to a first embodiment along an axial direction of a tank, the gas circuit breaker being in an open-circuit state. FIG. 3 is a cross-sectional view of the gas circuit breaker according to the first embodiment along the axial direction of the tank, the gas circuit breaker being in a closed-circuit state. FIG. 4 is a diagram illustrating a stator of the gas circuit breaker according to the first embodiment, the stator being viewed in cross section perpendicular to the axial direction of the tank. FIG. 5 is a diagram illustrating a mover of the gas circuit breaker according to the first embodiment, the mover being viewed in cross section perpendicular to the axial direction of the tank. FIG. 1 illustrates a cross section of a stator 30 taken along line I-I in FIG. 4 together with a cross section of a mover 40 taken along line I-I in FIG. 5. FIG. 2 illustrates a cross section of the stator 30 taken along line II-II in FIG. 4 together with a cross section of the mover 40 taken along line II-II in FIG. 5. FIG. 4 illustrates a cross section taken along line IV-IV in FIG. 1. FIG. 5 illustrates a cross section taken along line V-V in FIG. 1.

A gas circuit breaker 100 includes a tank 20 which is a cylindrical metal container in which insulating gas is enclosed. The insulating gas is a gas having electrical insulation properties and arc-extinguishing properties, such as sulfur hexafluoride gas. The gas circuit breaker 100 includes a driving device (not illustrated) that moves the mover 40 in the tank 20. The gas circuit breaker 100 includes the mover 40 and the stator 30. The mover 40 moves in the tank 20 due to driving force transmitted from the driving device (not illustrated) via a hollow rod-shaped operating rod 1. No driving force is transmitted from the driving device (not illustrated) to the stator 30. The stator 30 is fixed inside the tank 20, and the position of the stator 30 does not change. The mover 40 is disposed in such a way as to face the stator 30 in the axial direction of the tank 20, and moves between a closing position and a cutoff position. When located in the closing position, the mover 40 is in contact with the stator 30, and when located in the cutoff position, the mover 40 is out of contact with the stator 30. When the mover 40 is located in the closing position, the gas circuit breaker 100 is in a closed-circuit state. When the mover 40 is located in the cutoff position, the gas circuit breaker 100 is in an open-circuit state. The gas circuit breaker 100 supplies and interrupts alternating current between the stator 30 and the mover 40.

The stator 30 includes a stator-side main contact 8, a stator-side arcing contact 9, and a stator-side resistance contact 5. The mover 40 includes a puffer cylinder 2, mover-side resistance contacts 3, a nozzle 4, a mover-side arcing contact 6, and a mover-side main contact 7. The stator-side main contact 8, the stator-side arcing contact 9, the mover-side main contact 7, and the mover-side arcing contact 6 form a main breaker for performing closing and breaking. The operating rod 1 transmits driving force from an operating device (not illustrated) to the mover-side main contact 7 and the mover-side arcing contact 6 of the main breaker. The stator-side resistance contact 5 and the mover-side resistance contacts 3 form a resistance closing unit that suppresses overvoltage at the time of closing. The operating rod 1 transmits driving force from the operating device (not illustrated) to the mover-side resistance contacts 3 of the resistance closing unit.

The stator-side main contact 8 has a cylindrical shape. The stator-side main contact 8 extends in the axial direction of the tank 20, and is fixed inside the tank 20. The stator-side arcing contact 9 has a rod shape extending along a central axis of the stator-side main contact 8. The stator-side resistance contact 5 has a ring shape surrounding the stator-side main contact 8 from the outer circumferential direction of the tank 20, and is connected to an electric resistor. The mover-side resistance contacts 3 are installed at regular intervals in a circumferential direction at portions where the mover-side resistance contacts 3 face the stator-side resistance contact 5, on the outer circumferential side of the puffer cylinder 2 and in the axial direction of the tank 20. Specifically, arms 15 protrude in four directions from the puffer cylinder 2, and the mover-side resistance contact 3 is installed on each of the arms 15. The mover-side main contact 7 is disposed in such a way as to face the stator-side main contact 8 in the axial direction of the tank 20.

The stator-side resistance contact 5 is supported by springs 12 and dashpots 13 from a direction opposite to a direction in which the stator-side resistance contact 5 faces the mover 40, and is movable in the axial direction of the tank 20 in association with extension and contraction of the springs 12 and the dashpots 13. Note that while the stator-side resistance contact 5 is movable in the axial direction of the tank 20, no driving force is transmitted from the operating device (not illustrated) to the stator-side resistance contact 5 via the operating rod 1, so that the stator-side resistance contact 5 is not a part of the mover 40. The dashpot 13 is a damper that resists movement by using the viscous resistance of fluid. It is possible to extend and contract the dashpot 13 with a weak force when extending and contracting the dashpot 13 at a low speed. Meanwhile, it is necessary to apply a strong force when extending and contracting the dashpot 13 at a high speed. The springs 12 and the dashpots 13 bias the stator-side resistance contact 5 toward the mover 40. Therefore, the stator-side resistance contact 5 is brought close to the mover-side resistance contacts 3 by the springs 12 and the dashpots 13. The ring-shaped stator-side resistance contact 5 surrounds the stator-side main contact 8 and the stator-side arcing contact 9 from the outer circumferential direction, so that the stator-side resistance contact 5 functions as a stator-side shield that protects the stator-side main contact 8 and the stator-side arcing contact 9 from an electric field at the time of energization.

In a state where the mover 40 is located in the cutoff position, a distance between each mover-side resistance contact 3 and the stator-side resistance contact 5 is less than a distance between the mover-side main contact 7 and the stator-side main contact 8.

The nozzle 4 is connected to the internal space of the puffer cylinder 2, and is directed to the stator-side arcing contact 9. In addition, the mover-side arcing contact 6 is disposed inside the nozzle 4. Therefore, when the volume of the internal space of the puffer cylinder 2 decreases due to opening operation, the insulating gas in the puffer cylinder 2 is discharged from the nozzle 4 through the periphery of the mover-side arcing contact 6 and blown onto the stator-side arcing contact 9, and also flows through the inside of the operating rod 1 toward an outlet (not illustrated) in the direction of the driving device (not illustrated).

Furthermore, a mover-side shield 14 is provided inside the tank 20. The mover-side shield 14 surrounds the mover-side main contact 7 and the mover-side arcing contact 6 from the outer circumferential direction.

When the mover 40 is located in the closing position, the mover-side arcing contact 6 is in contact with the stator-side arcing contact 9. In addition, when the mover 40 is located in the closing position, the mover-side resistance contacts 3 are in contact with the stator-side resistance contact 5. Furthermore, when the mover 40 is located in the closing position, the mover-side resistance contacts 3 are pressed against the stator-side resistance contact 5, so that the springs 12 and the dashpots 13 are compressed.

When the mover 40 is located in the cutoff position, the mover-side arcing contact 6 is out of contact with the stator-side arcing contact 9. In addition, when the mover 40 is located in the cutoff position, the mover-side resistance contacts 3 are out of contact with the stator-side resistance contact 5. Furthermore, when the mover 40 is located in the cutoff position, the stator-side resistance contact 5 is brought close to the mover-side resistance contacts 3 within a movable range due to extension of the springs 12 and the dashpots 13.

In closing operation in which the mover 40 moves from the cutoff position to the closing position, the springs 12 and the dashpots 13 bring the stator-side resistance contact 5 close to the mover-side resistance contacts 3, so that the distance between each mover-side resistance contact 3 and the stator-side resistance contact 5 is less than the distance between the mover-side main contact 7 and the stator-side main contact 8. Accordingly, the stator-side resistance contact 5 and the mover-side resistance contacts 3 first come into contact with each other. Therefore, voltage is applied to a resistance circuit during the closing operation. This suppresses overvoltage from occurring in a system during the closing operation as compared with the case of using no closing resistor. Specifically, when voltage is applied to a power transmission line by the closing operation of the gas circuit breaker 100, overvoltage occurs in the system due to a potential difference between the power source side and the line side at the time of closing. Addition of a resistor of an appropriate value to a closing circuit of the gas circuit breaker 100 can suppress the peak value of a so-called closing surge that is overvoltage that occurs at the time of closing. Thereafter, the stator-side arcing contact 9 and the mover-side arcing contact 6 come into contact with each other, and subsequently the stator-side main contact 8 and the mover-side main contact 7 come into contact with each other. As a result, the closing operation is completed. An impact caused by the mover-side resistance contacts 3 hit against the stator-side resistance contact 5 is absorbed by the contraction of the springs 12. The dashpots 13 attenuate vibration of the springs 12 caused by absorption of the impact. This prevents occurrence of jitter in which the mover-side resistance contacts 3 and the stator-side resistance contact 5 repeatedly come into contact and come out of contact with each other. When the closing operation is completed and the gas circuit breaker 100 is turned on, the springs 12 and the dashpots 13 are compressed.

When the opening operation is being performed in which the mover 40 moves from the closing position to the cutoff position, the dashpots 13 are contracted. Therefore, the mover-side main contact 7 comes out of contact with the stator-side main contact 8, and at the same time, the mover-side resistance contacts 3 come out of contact with the stator-side resistance contact 5. Thereafter, the mover-side arcing contact 6 comes out of contact with the stator-side arcing contact 9. Therefore, although an arc is generated between the mover-side arcing contact 6 and the stator-side arcing contact 9, the arc is extinguished by the insulating gas blown onto the mover-side arcing contact 6 and the stator-side arcing contact 9.

Figure 6:
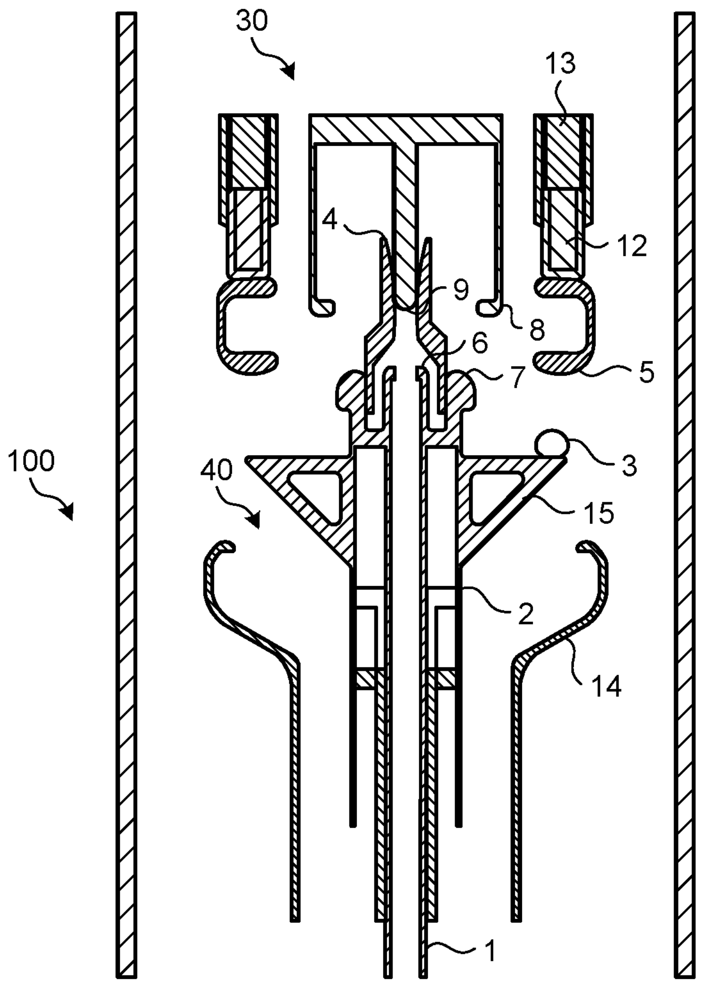
FIG. 6 is a cross-sectional view of the gas circuit breaker according to the first embodiment along the axial direction of the tank, the gas circuit breaker being in a state where an arc is extinguished during opening operation.

FIG. 6 is a cross-sectional view of the gas circuit breaker according to the first embodiment along the axial direction of the tank, the gas circuit breaker being in a state where an arc is extinguished during opening operation. When the mover 40 starts to move toward the cutoff position, the dashpots 13 start to extend. The viscous resistance of the fluid also acts on the dashpots 13 when the dashpots 13 extend. Accordingly, the dashpots 13 do not fully extend in a short time before an arc is extinguished. Therefore, when the arc is extinguished, the dashpots 13 have hardly extended, and only the mover 40 has moved toward the cutoff position. As a result, when the arc is extinguished, an insulation distance between the stator-side resistance contact 5, which also serves as the stator-side shield, and each mover-side resistance contact 3 is ensured. Accordingly, reignition does not occur even in the case of interrupting a small current for which an arc is extinguished in a short time. Furthermore, when the dashpots 13 extend, the mover 40 has already finished moving to the cutoff position, so that the mover-side resistance contacts 3 and the stator-side resistance contact 5 are suppressed from coming into contact with each other during the opening operation.

In the gas circuit breaker 100 according to the first embodiment, the insulation distance between the stator-side resistance contact 5, which also serves as the stator-side shield, and each mover-side resistance contact 3 is ensured even in the case of interrupting a small current for which an arc is extinguished in a short time. Therefore, it is possible to suppress occurrence of reignition at the time of interruption of a small current. In addition, since the operating rod 1 transmits power from the operating device (not illustrated) to both the main breaker and the resistance closing unit, it is possible to use a common power transmission path serving as a power transmission path to the main breaker and a power transmission path to the resistance closing unit, so that weight and the number of parts can be reduced.

Second Embodiment

Figure 7:
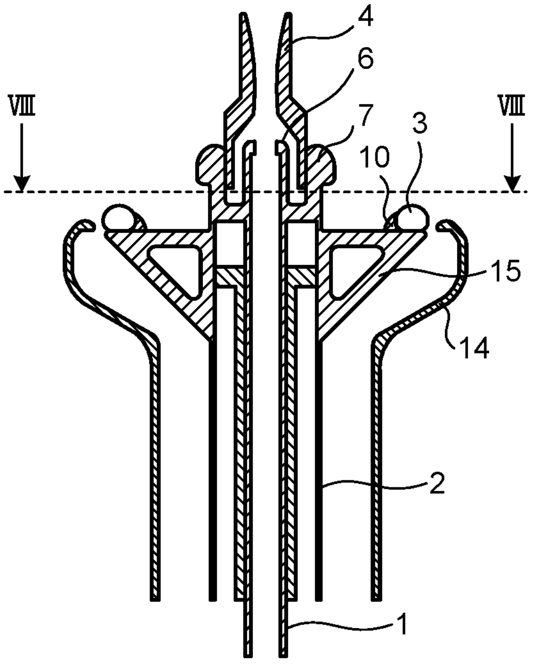
FIG. 7 is a cross-sectional view of a mover of a gas circuit breaker according to a second embodiment along an axial direction of a tank.
Figure 8:
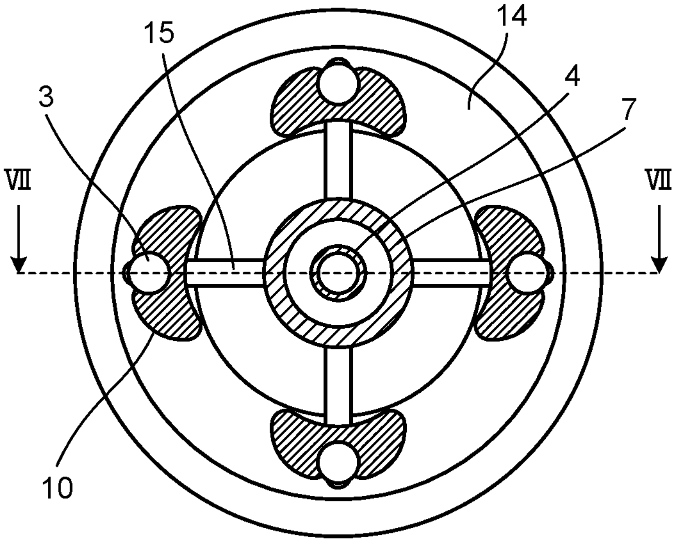
FIG. 8 is a diagram illustrating the mover of the gas circuit breaker according to the second embodiment, the mover being viewed in cross section perpendicular to the axial direction of the tank.

FIG. 7 is a cross-sectional view of a mover of a gas circuit breaker according to a second embodiment along an axial direction of a tank. FIG. 8 is a diagram illustrating the mover of the gas circuit breaker according to the second embodiment, the mover being viewed in cross section perpendicular to the axial direction of the tank. FIG. 7 illustrates a cross section taken along line VII-VII in FIG. 8. FIG. 8 illustrates a cross section taken along line VIII-VIII in FIG. 7. The gas circuit breaker 100 according to the second embodiment is different from the gas circuit breaker 100 according to the first embodiment in that massive shields 10 are provided in such a way as to surround the respective mover-side resistance contacts 3. The surface of each shield 10 is a closed surface having no sharp portion.

In the gas circuit breaker 100 according to the second embodiment, each mover-side resistance contact 3 is surrounded by the shield 10. It is thus possible to suppress concentration of an electric field not only on the mover-side main contact 7 but also on the mover-side resistance contacts 3.

Third Embodiment

Figure 9:
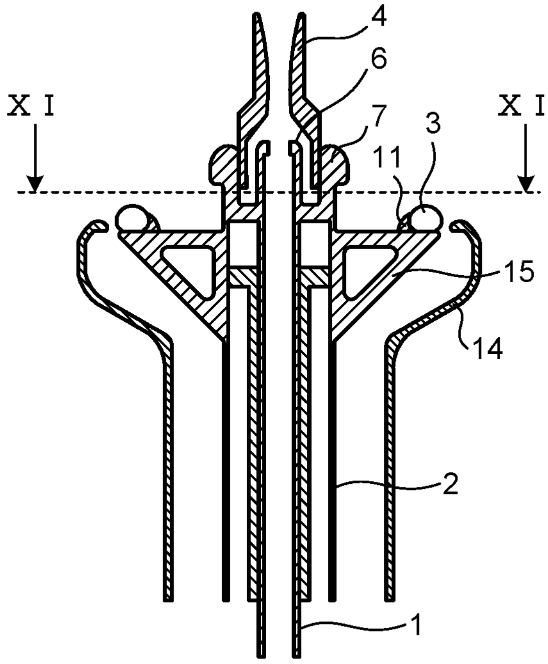
FIG. 9 is a cross-sectional view of a mover of a gas circuit breaker according to a third embodiment along an axial direction of a tank.
Figure 10:
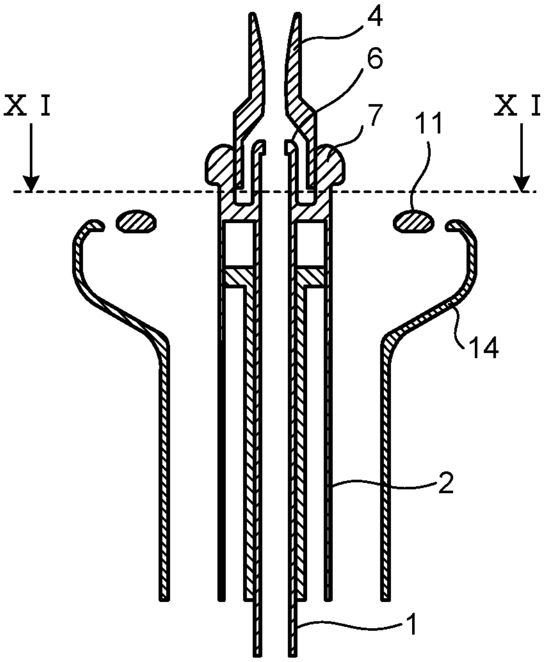
FIG. 10 is a cross-sectional view of the mover of the gas circuit breaker according to the third embodiment along the axial direction of the tank.
Figure 11:
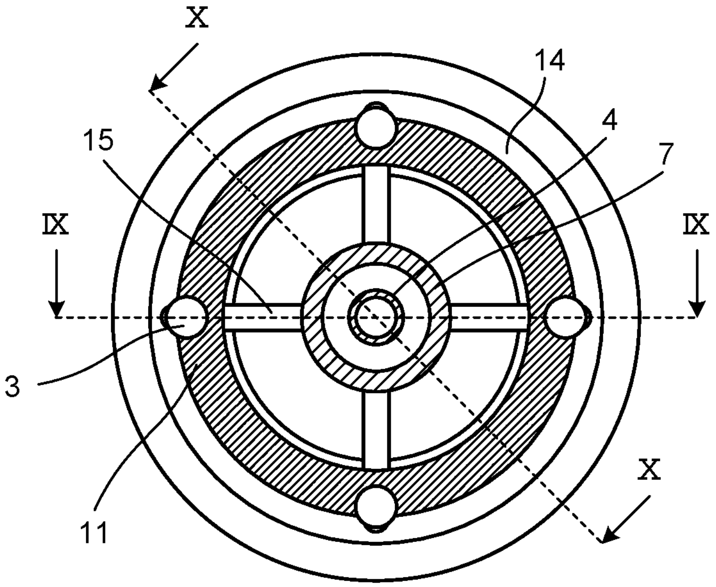
FIG. 11 is a diagram illustrating the mover of the gas circuit breaker according to the third embodiment, the mover being viewed in cross section perpendicular to the axial direction of the tank.

FIGS. 9 and 10 are cross-sectional views of a mover of a gas circuit breaker according to a third embodiment along an axial direction of a tank. FIG. 11 is a diagram illustrating the mover of the gas circuit breaker according to the third embodiment, the mover being viewed in cross section perpendicular to the axial direction of the tank. FIG. 9 illustrates a cross section taken along line IX-IX in FIG. 11. FIG. 10 illustrates a cross section taken along line X-X in FIG. 11. FIG. 11 illustrates a cross section taken along line XI-XI in FIGS. 9 and 10. The gas circuit breaker 100 according to the third embodiment is different from the gas circuit breaker 100 according to the first embodiment in that a ring-shaped shield 11 surrounding the mover-side resistance contacts 3 is provided. The surface of the shield 11 is a closed surface having no sharp portion.

In the gas circuit breaker 100 according to the third embodiment, since the shield 11 is ring-shaped, an electric field cannot enter through a gap in the shield 11. It is thus possible to enhance the effect of suppressing concentration of an electric field on the mover-side resistance contacts 3 as compared with the gas circuit breaker 100 according to the second embodiment. Furthermore, in the gas circuit breaker 100 according to the third embodiment, since the mover-side resistance contacts 3 are connected to each other by the shield 11, it is possible to suppress the arms 15 from being bent and suppress the mover-side resistance contacts 3 from being displaced in a circumferential direction.

Note that in the gas circuit breaker 100 according to the third embodiment, since the shield 11 has a ring shape, the weight of the mover 40 increases and the speed of opening operation decreases as compared with the gas circuit breaker 100 according to the second embodiment in which each shield 10 is in massive form. It is desirable to apply the gas circuit breaker 100 according to the second embodiment when priority is given to the speed of the opening operation, and apply the gas circuit breaker 100 according to the third embodiment when priority is given to the effect of suppressing concentration of an electric field on the mover-side resistance contacts 3.

The configurations set forth in the above embodiments show examples, and it is possible to combine the configurations with another technique that is publicly known, and is also possible to make omissions and changes to part of the configurations without departing from the scope of the present disclosure.

REFERENCE SIGNS LIST

1 operating rod; 2 puffer cylinder; 3 mover-side resistance contact; 4 nozzle; 5 stator-side resistance contact; 6 mover-side arcing contact; 7 mover-side main contact; 8 stator-side main contact; 9 stator-side arcing contact; 10, 11 shield; 12 spring; 13 dashpot; 14 mover-side shield; 15 arm; 20 tank; 30 stator; 40 mover; 100 gas circuit breaker.

The invention claimed is:

1. A gas circuit breaker comprising:

a cylindrical tank in which insulating gas is enclosed;

a stator fixed inside the tank; and a mover disposed in such a way as to face the stator in an axial direction of the tank, the mover being movable between a closing position and a cutoff position, the mover being in contact with the stator when located in the closing position, the mover being out of contact with the stator when located in the cutoff position, wherein the stator includes:

a stator-side main contact extending in the axial direction of the tank, the stator-side main contact being fixed inside the tank;

a stator-side resistance contact connected to an electric resistor, the stator-side resistance contact having a ring shape surrounding the stator-side main contact from an outer circumferential direction of the tank and adapted to protect the stator-side main contact from an electric field; and a spring and a dashpot supporting the stator-side resistance contact from a direction opposite to a direction in which the stator-side resistance contact faces the mover, the spring and the dashpot supporting the stator-side resistance contact such that the stator-side resistance contact is movable in the axial direction of the tank, the spring and the dashpot biasing the stator-side resistance contact in a direction in which the stator-side resistance contact approaches the mover, the mover includes:

a mover-side main contact disposed in such a way as to face the stator-side main contact in the axial direction of the tank; and mover-side resistance contacts disposed in such a way as to face the stator-side resistance contact in the axial direction of the tank, and in a state where the mover is located in the cutoff position, a distance between the mover-side resistance contacts and the stator-side resistance contact is less than a distance between the mover-side main contact and the stator-side main contact, wherein the mover includes solid shields, each shield has a closed surface without sharp edges and surrounding the respective mover-side resistance contact of the mover-side resistance contacts.

2. The gas circuit breaker according to claim 1, wherein the stator-side main contact has a cylindrical shape, the stator includes a stator-side arcing contact having a rod shape extending along a central axis of the stator-side main contact, the mover includes:

a nozzle directed to the stator-side arcing contact;

a mover-side arcing contact disposed inside the nozzle, the mover-side arcing contact being in contact with the stator-side arcing contact in a state where the mover-side arcing contact is located in the closing position; and a puffer cylinder with an internal space connected to the nozzle, a volume of the internal space decreasing during opening operation in which the mover moves from the closing position to the cutoff position, and in the opening operation, the mover-side main contact comes out of contact with the stator-side main contact, and after the mover-side resistance contacts come out of contact with the stator-side resistance contact, the mover-side arcing contact comes out of contact with the stator-side arcing contact.

* * * * *